Figure 1:
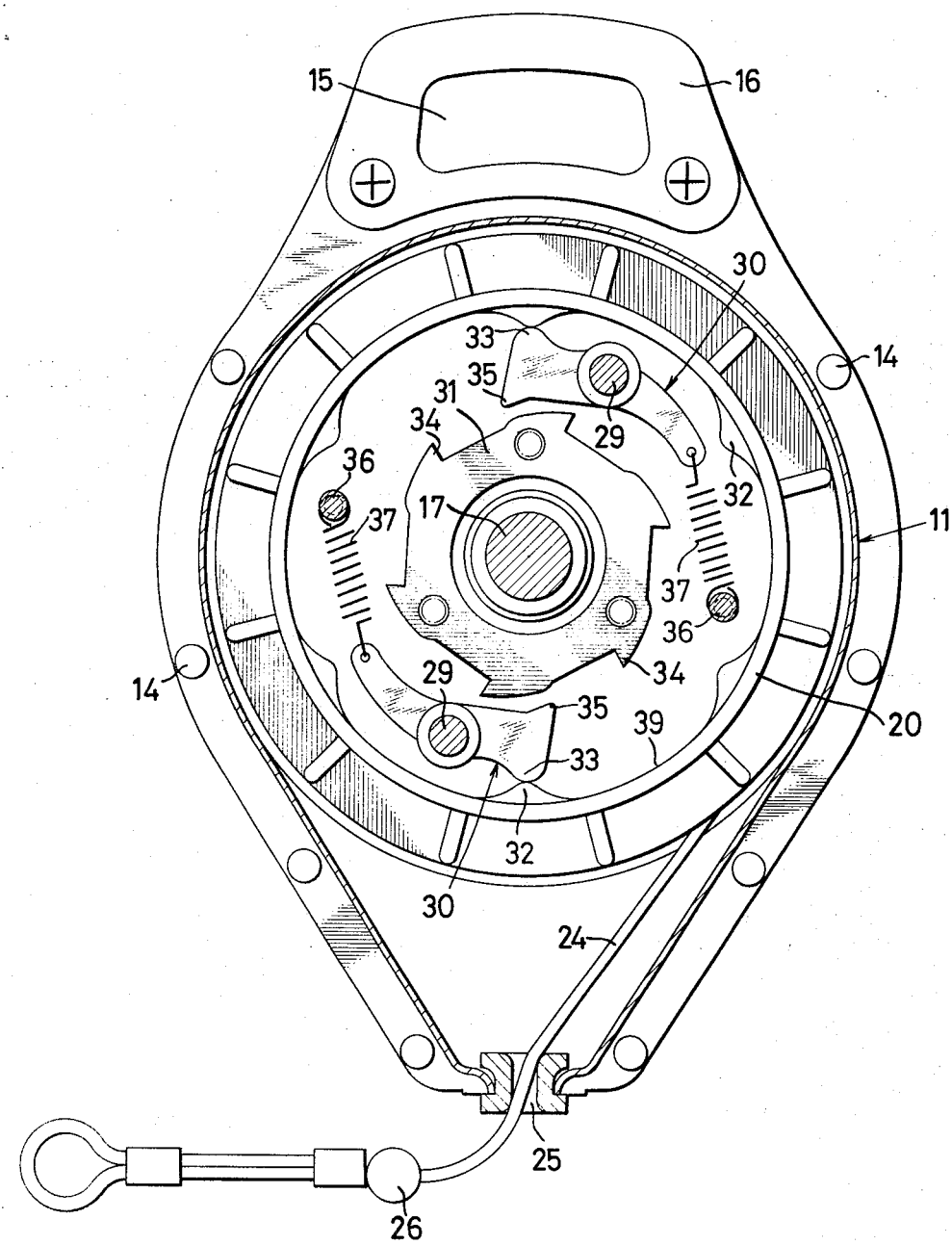

United States Patent [19]
Koshihara

[11] 3,760,910
[45] Sept. 25, 1973

[54] SAFETY DEVICE

[76] Inventor: Atsuo Koshihara, 25-2 Omino, Sakai, Japan

[22] Filed: Apr. 14, 1972

[21] Appl. No.: 244,176

[52] U.S. Cl. ............................... 188/180, 254/157
[51] Int. Cl. ............................................. F16d 59/00
[58] Field of Search .................... 188/180, 184, 186, 188/187, 189; 242/107.3; 254/157, 159

[56] References Cited
UNITED STATES PATENTS

| | | | |
|---|---|---|---|
| 490,222 | 1/1893 | Arnold | 188/184 X |
| 2,990,131 | 6/1961 | Carlsson | 254/157 X |
| 3,016,113 | 1/1962 | Easley | 188/189 |

*Primary Examiner*—Duane A. Reger
*Attorney*—E. F. Wenderoth et al.

[57] ABSTRACT

A safety device for preventing a worker working in a high place from falling. The device has a flat and hollow case and a rope outlet opening at the lower portion thereof. A rope winding reel is rotatably mounted in the case, and a rope has one end attached to the reel, the other end extending out of an outlet opening in the case. A spiral spring in the case biases the reel in a direction to wind the rope. Spring loaded pawls mounted on a rotatable disc adjacent the reel engage a ratchet wheel fixed concentrically within the pawls adjacent the reel. The inner periphery of the reel has lugs and recessed portions formed alternately at suitable intervals therearound, which engage the pawls to rock the pawls when the reel is turned. A brake system is provided between the disc and the case to brake the disc and properly dampen the disc when the disc is rotated.

2 Claims, 3 Drawing Figures

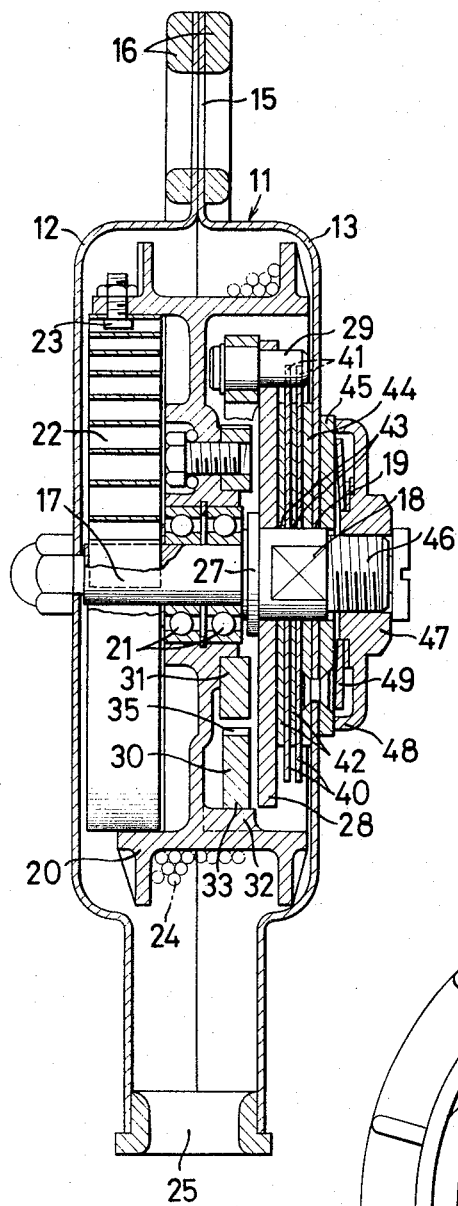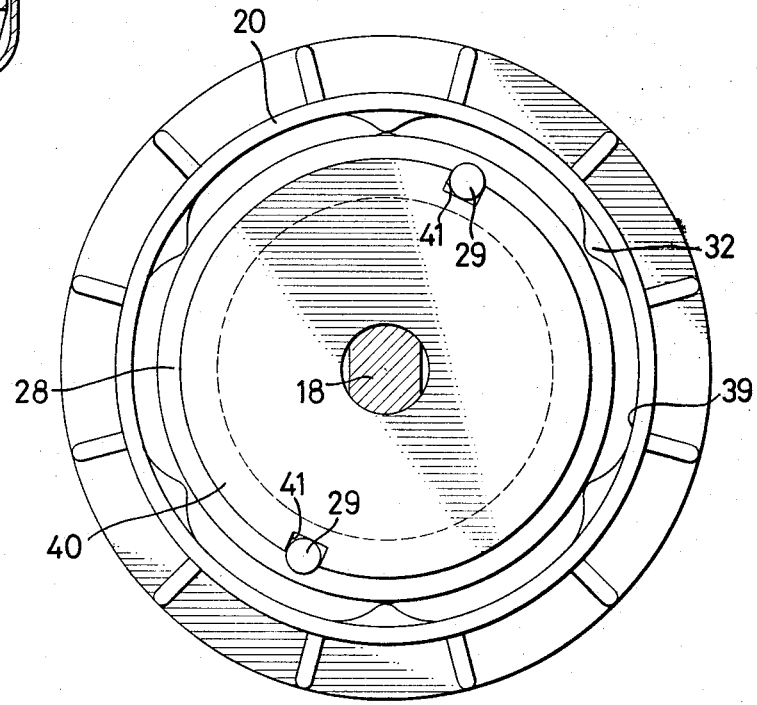

SAFETY DEVICE

This invention relates to the improvement of a safety device for preventing a worker working in a high place from the danger of falling.

A safety device is known which is designed to protect a worker from death and injury caused by falling when working at high places.

This prior safety device comprises a case adapted to be suspended from a structure, a rope winding reel mounted rotatably in the interior thereof, a spiral spring for driving said reel in a direction for winding the rope, a centrifugal clutch mechanism adapted to be initially actuated when said reel is rotated by the rope and whose speed of rotation then becomes a prescribed value and a damping brake mechanism for braking the rotation of the reel when said clutch is actuated.

With this safety device, the case is fixed to a structure or the like and the rope drawn out of the case is fastened on the worker's belt or harness. When the worker is working normally, the centrifugal clutch is never actuated since the speed of rotation of the reel is slow. Accordingly, the reel is rotated freely and the rope is drawn out or wound up freely. If the worker should fall from a high place, the rope is drawn out rapidly. Therefore, the reel is then rotated at a high speed. Subsequently, the centrifugal clutch is actuated and the damping brake mechanism brakes the reel which stops the rope from drawing out. This prevents death and injury caused by falling.

The former safety device such as described above may be able to accomplish at least part of its objective, but has various drawbacks.

In an emergency the centrifugal clutch mechanism is actuated and in order for the rope winding reel and the damping brake mechanism to be coupled, a centrifugal pawl must always be provided at the reel side. The ratchet engaged by said centrifugal pawl must be positioned at the outside of the reel. Therefore, a ratchet rim formed with ratchet teeth on the inner periphery thereof is used. As the brake mechanism is adapted to be actuated with the turning force transmitted to this ratchet rim, the construction thereof becomes complicated. Furthermore, the case is required to be strong, and thereby it becomes larger and heavier. Therefore, it is very inconvenient to transport it to a high place. In addition, since the spring incorporated in the brake mechanism can not be adjusted from the outside, the brake mechanism must be disassembled when adjustment is needed to maintain the damping brake force proper. Furthermore, once it is actuated, the construction of the device is such that the mechanism can not be returned automatically. Because of these various drawbacks, prior art devices have not been practical.

The primary object of this invention is to provide a safety device which is simple in construction, light in weight and which is easy to transport.

A second object of this invention is to provide a reliable safety device which can return automatically after an operation.

A third object of this invention is to provide a safety device whose brake force can be adjusted from the outside.

Each of those objects is accomplished by the specific construction of this invention, an embodiment of which is illustrated in the accompanying drawings and a detailed explanation of which is described hereunder.

In the drawing, 11 is a case formed by joining a pair of members 12 and 13. These are held together with a plurality of rivets 14 at the circumference thereof. An engaging opening 15 is formed at the upper portion thereof, and reinforcing members 16 are provided at the circumference of the opening.

A fixed shaft 17 is secured at its rear end in the center of the member 12. At opposite sides of the fixed shaft 17 are formed flat portions to make the flattened shaft portion 18 as shown in FIG. 3. In the center of the member 13 is provided an opening 19 formed to accommodate the flattened shaft portion 18, and in turn the flattened shaft portion 18 is fitted in this opening.

A rope winding reel 20 is mounted rotatably on the shaft 17 through the bearings 21 and is a spiral spring 22 is mounted in the rear inner side of the reel 20. The outer end of this spiral spring 22 is fixed to the inner periphery of the reel 20 with a bolt 23, and the inner end thereof is interposed in a groove of the shaft 17 and fixed thereto with a set screw or the like. One end of a rope 24 is securely attached to a portion of the periphery of the reel 20. The other end of this rope 24 is drawn out of the case 11 from the outlet opening 25 located at the lower end thereof. The spiral spring 22 imports a turning force to the reel and the rope 24 is thereby wound up on the reel by this turning force. Accordingly, when no drawing force acts on the rope 24, almost all of the rope 24 is to be wound up on the reel 20. A stopper 26 check the end of the rope 24 so that it will not drawn into the case 11.

In FIG. 2, 27 is a flange provided on the shaft 17. The central opening of a disc 28 is fitted loosely on the shaft 17 to be located at the front of the flange 27 and is rotated freely with respect to the shaft 17. On the periphery of this disc 28 are fixed a pair of pins 29 in symmetrical positions. On each pin 29 is symmetrically mounted one of a pair of rocking pieces 30.

In the front center of said reel 20 is fixed a ratchet wheel 31 and a plurality of lugs 32 are formed on the inner periphery of the front half of the reel 20. These lugs 32 are rounded on the projected portions thereof as shown in FIG. 1 and contact with the lug 33 at the outside of the front end of the rocking piece 30. At the inside of the front end of the rocking piece 30 is formed a pawl 35 which is engageable with the pawl 34 of the ratchet wheel.

Between the rear end of each of the rocking pieces 30 and one of the pair of the pins provided at rear side of the disc 28 is stretched a tension spring 37. Each tension spring 37 is designed to make each rocking piece 30 continuously contact the inner periphery of the reel 20. Accordingly, each rocking piece 30 always has the lug 33 at the outside of the front end thereof in contact with the lugs 32 or the recessed portions 39 of the reel 20. And, when the lug 33 of each rocking piece 30 contacts the lug 32 of the reel 20, the pawl 35 is prevented from contacting the pawl 34 of the ratchet wheel 31.

In addition, the directions of the pawl 35 and the ratchet pawl 34 are oriented so that they may be engaged when the reel 20 is turned in the direction which feeds out the rope 24.

As seen in FIG. 2, two rotary discs 40 with circular openings in the center thereof are rotatably fitted on the outer periphery of the flattened shaft portion 18 of the shaft 17. A pair of notches 41 on the periphery of each of the rotary discs 40 engages the front portions of pins 29 so that each of the discs 40 is rotated together with disc 28.

Brake plates 42 of disc-like shape are interposed between the discs 40, and the disc 28 and the disc 40. Each of the brake plates 42 is formed so that the opening 43 in the center thereof accommodates the flattened shaft portion 18. Accordingly, the brake plates 42 are prevented from rotating when this opening 43 is fitted on the flattened shaft portion 18. Seat plates 44 and 45 are fixed on the inside and outside of the central portion of the case 11 with rivets. The openings in the central portions of these seat plates 44 and 45 also accommodate the flattened shaft portion 18. At the outer end of the flattened shaft portion is formed an external thread 46, and on this external thread is screwed the internal thread in the center of the adjusting member 47. The member 47 is of disc-like shape and on the peripheral edge thereof is formed a projected edge 48 directed toward said seat plate 45. In the interior of the projected edge 48 is mounted a dished spring 49 between the seat plate 45 and the adjusting member 47.

Discs 40 and 42 can be moved axially with respect to the flattened shaft portion 18. And, the seat plates 44 and 45 also can be moved axially together with the portion of the case 11 near the seat plate. Accordingly, the case 11 is made of an elastically deformable material such as steel plate.

The dished spring 49 presses the seat plate 45 against the seat plate 44 and forces the discs 40 and 28 and the brake plates 42 against each other. Accordingly, when the elastic force of the dished spring 49 is adjusted by turning the adjusting member 47 along the external thread 46, the contacting surface pressure of the seat plate 44, the discs 40 and 28 and the brake plates 42 can be adjusted. Discs 28 and 40 and the brake plates 42 constitute the braking system.

The safety device constructed as above mentioned is suspended from a suitable support by utilizing the engaging opening 15. And, the front end of the rope 24 drawn out of the outlet opening 25 is connected to the worker by any known means.

When the worker moves away from the case 11, the rope 24 is drawn out. At this time, the reel 20 is turned in a direction to tighten the spiral spring 22. Accordingly, when the worker comes nearer to the case 11, the reel 20 is turned in a direction to wind the rope by the restoring force of the spiral spring 22 and the slackened rope 24 is wound up. As a result, no slack is ever left in the rope 24 which would be an obstacle to the worker. When the reel 20 is turned as above mentioned, the rocking piece 30 is rocked by the lug 33 contacting the lug 32 and the recessed portion 39 on the inner periphery thereof. But, even when the lug 33 contacts the lug 32, the pawl 35 does not engage the ratchet pawl 34. Consequently, when the reel 20 is rotating normally, the reel 20 is independent of the braking system.

When the worker falls down by mistake, the rope 24 is drawn out rapidly. Since the reel 20 is also rotated rapidly thereby, each rocking piece 30 is also rocked rapidly. Accordingly, the amplitude of the rocking piece 30 is increased by inertia. Therefore, at the instance when the pawl 35 moves inward, the pawl 34 of the ratchet wheel 31 rotating together with the reel 20 is engaged with the pawl 35.

When the ratchet pawl 34 and the pawl 35 are engaged together, the disc 28 attached to the pawl 35 is rotated together with the reel 20. And, since the disc 28 is connected with the discs 40 by the pins 29 and the notches 41, discs 40 are also rotated.

On the other hand, since the brake plate 42 is mounted on the flattened shaft portion 18 of the fixed shaft 17 so as not to rotate, even if the disc 28 is rotated as above mentioned, the brake plate 42 does not. Seat plate 44 also remains stationary.

Consequently, there is brought about a frictional resistance between each rotating disc 40 and the brake plates 42 and the seat plate 44 which are each stationary. This will serve as a braking force and thereby the rotation of the reel 20 becomes slower, and at finally comes to rest. Accordingly, the drawing out of the rope 24 is stopped, and the fall of the worker will be halted.

Thereafter, the worker can be rescued, and when the rope 24 is slackened, the reel 20 and the ratchet wheel 31 are reversely rotated, and the ratchet pawl 34 and the pawl 35 disengage and return back.

The adjustment of the brake force mentioned above can be carried out by adjusting the pressure of the spring 49 with rotation of the adjusting member 47. Accordingly, the brake force can be adjusted easily.

In addition, the ratchet wheel 31 may be reduced in diameter and fixed in the central portion of the reel 20, the rocking pieces 30 of the disc 28 of the braking system may be located at the outside of the ratchet wheel 31 and the braking system such as the discs 40 and the brake plates 42 may be incorporated within the reel 20. And, since almost all of the spiral spring 22 can be housed in the reel 20, the safety device can be made much smaller and lighter, and can be transported very easily to a high place.

What is claimed is:

1. A safety device comprising a relatively flat hollow case having a rope outlet opening at the lower portion thereof, a fixed shaft secured within said case, a rope winding reel rotatably mounted on said fixed shaft, a rope having one end thereof attached to said reel and having the other end thereof passing out of said outlet opening; a spiral spring means mounted between said reel and said fixed shaft for imparting a turning force to said reel in a direction to wind said rope, disc shaped means rotatably mounted on said fixed shaft adjacent said reel; a plurality of rocking pieces pivotally mounted on said disc means; each of said rocking pieces having a pawl at one side of one end thereof and a rounded lug at the other side of said one end; a ratchet wheel concentrically fixed at one side of said reel adjacent said rocking pieces and having a plurality of ratchet pawls on the periphery thereof, said ratchet pawls being adapted to engage said pawls located at said ends of said rocking pieces; a plurality of lugs and a plurality of recessed portions alternately formed on the inner periphery of said reel and adapted to contact said rounded lugs of said rocking pieces; spring means normally urging each of said lugs of said rocking pieces towards said plurality of lugs and recessed portions and normally urging said pawls of said rocking pieces away from said ratchet pawls, and a brake system located between said disc means and said case for braking the rotary movement of said disc means.

2. A safety device as claimed in claim 1 wherein said brake system comprises said disc means, a plurality of discs rotatable with said disc means, a plurality of brake plates fixedly mounted on said fixed shaft and arranged concentric to and alternating with said discs and said disc means, a spring means causing said brake plates to engage said discs and said disc means, and an adjusting member secured to one end of said fixed shaft for adjusting the elastic force of said spring means.

* * * * *